US012559346B2

(12) United States Patent
Bloomgren

(10) Patent No.: US 12,559,346 B2
(45) Date of Patent: Feb. 24, 2026

(54) ELEVATOR SYSTEM WITH QUEUEING FUNCTION FOR ROBOT TRAFFIC

(71) Applicant: INVENTIO AG, Hergiswil (CH)

(72) Inventor: Ryan Bloomgren, Landing, NJ (US)

(73) Assignee: INVENTIO AG, Hergiswil (CH)

( * ) Notice: Subject to any disclaimer, the term of this patent is extended or adjusted under 35 U.S.C. 154(b) by 835 days.

(21) Appl. No.: 17/802,718

(22) PCT Filed: Mar. 12, 2021

(86) PCT No.: PCT/EP2021/056293
§ 371 (c)(1),
(2) Date: Aug. 26, 2022

(87) PCT Pub. No.: WO2021/180907
PCT Pub. Date: Sep. 16, 2021

(65) Prior Publication Data
US 2023/0110004 A1 Apr. 13, 2023

(30) Foreign Application Priority Data
Mar. 13, 2020 (EP) .................................... 20162865

(51) Int. Cl.
*B66B 1/46* (2006.01)

(52) U.S. Cl.
CPC ........ *B66B 1/468* (2013.01); *B66B 2201/101* (2013.01); *B66B 2201/215* (2013.01);
(Continued)

(58) Field of Classification Search
CPC .... B66B 2201/4661; B66B 2201/4638; B66B 2201/23; B66B 2201/215;
(Continued)

(56) References Cited

U.S. PATENT DOCUMENTS 8,958,910 B2 2/2015 Ichinose et al.
11,261,053 B2 * 3/2022 Vuorenala .............. B25J 9/1679
2012/0041593 A1 * 2/2012 Ichinose ............... B66B 1/2458
700/258

FOREIGN PATENT DOCUMENTS

CN 105270937 A 1/2016
CN 110730931 A 1/2020
(Continued)

OTHER PUBLICATIONS

Vuorenala et al. (CN 110790097 A) Generating The Control Signal To The Conveyor System (Year: 2020).*
(Continued)

*Primary Examiner* — Jorge L Carrasquillo
(74) *Attorney, Agent, or Firm* — Knobbe, Martens, Olson & Bear, LLP

(57) ABSTRACT

In an elevator installation, an elevator control system is configured to receive an elevator call from a person via a call terminal and from a robot via a radio transceiver. A current transport capacity of the elevator installation is determined. An elevator call originating from the robot is recognized by the elevator control system, the call including a priority level set by a dispatcher, wherein the priority level is one of a high, a medium and a low priority range, wherein the elevator call is indicative of a boarding floor. The allocation of the elevator call originating from the robot to the elevator car is delayed if the priority level is set to the medium priority range and the current transport capacity is lower than a first threshold value, or if the priority level is set to the low priority range and the current transport capacity is lower than a second threshold value.

15 Claims, 3 Drawing Sheets

(52) U.S. Cl.
CPC ... *B66B 2201/23* (2013.01); *B66B 2201/4638* (2013.01); *B66B 2201/4661* (2013.01)

(58) Field of Classification Search
CPC .............. B66B 2201/104; B66B 1/468; B66B 2201/101; B66B 1/2408
USPC .......................................................... 187/388
See application file for complete search history.

(56) References Cited

FOREIGN PATENT DOCUMENTS

| | | | |
|---|---|---|---|
| CN | 110790097 | A | 2/2020 |
| JP | 2001114479 | A | 4/2001 |
| JP | 2001171918 | A | 6/2001 |
| JP | 2020011805 | A | 1/2020 |
| WO | WO 2018066057 | A1 | 4/2018 |

OTHER PUBLICATIONS

Mishima et al. (JP 2001171918 A)Elevator Control Device (Year: 2001).*
Tazume et al. (JP 2001114479 A) Controller of Elevator (Year: 2001).*
Machida et al. (WO 2018066057 A1) Elevator Control Device and Autonomous Moving Body Control Device (Year: 2018).*
Jeong-Gwan Kang, Su-Yong An, and Se-Young Oh, Navigation Strategy for the Service Robot in the Elevator Environment, , Oct. 17, 2007.
International Search Report for International Application No. PCT/EP2021/056293 dated Jun. 15, 2021.

* cited by examiner

ELEVATOR SYSTEM WITH QUEUEING FUNCTION FOR ROBOT TRAFFIC

TECHNICAL FIELD

The present disclosure of various embodiments generally relates to an elevator system and its operation. More particularly, the various embodiments described herein relate to an elevator system that can be used by persons and one or more autonomous mobile devices, and a method for controlling the operation of the elevator system to accommodate persons and the autonomous mobile devices.

SUMMARY

An elevator system may be equipped to operate according to a conventional up/down control system employing floor terminals having up/down buttons to call the elevator car by entering a passenger's desired direction of travel. After boarding an elevator car assigned to service that call, the passenger enters the destination floor at a car operation panel inside the car. An alternative elevator system may be equipped to operate according to a destination call control system employing floor terminals that allow a person to enter a desired destination floor. These elevator systems are typically used for transporting persons or goods from a boarding floor to a destination floor within a building.

In recent years, an additional need for transporting an autonomous mobile unit or robot evolved. Within a building, such a robot may perform one or more tasks that require the robot to be transported vertically from one floor to another floor. The tasks may include transporting goods, cleaning and guiding and/or assisting persons. To address the need to transporting a robot, various concepts are known. U.S. Pat. No. 8,958,910, for example, discloses an elevator system having a detection unit to detect an available area in an elevator car and a determination unit to determine whether or not a robot can board the elevator car based on information about the size and the position of the detected available area. The robot boards the elevator car only when the determination unit determines that boarding is possible.

Even though these approaches generally enable a robot to use an elevator installation, the operation of the elevator installation is slowed down by the robot's determination of available space in the elevator car. There is, therefore, a need for an alternative technology that affects less the operation of the elevator installation.

Accordingly, one aspect of such an improved technology involves a method of operating an elevator installation having an elevator control system and an elevator car controlled by the elevator control system to transport persons and/or robots from a boarding floor to a destination floor in a building. The elevator control system is configured to receive an elevator call from a person via a call terminal and from a robot via a radio transceiver to communicate with the elevator control system. A current transport capacity of the elevator installation is determined by the elevator control system, wherein the transport capacity is indicative of current usage of the elevator installation. An elevator call originating from the robot via the radio transceiver is recognized by the elevator control system, wherein the elevator call from the robot includes a priority level set by a dispatcher of the robot, wherein the priority level is one of a high priority range, a medium priority range and a low priority range, wherein the elevator call is indicative of a boarding floor. The allocation of the elevator call originating from the robot to the elevator car is delayed if the priority level is set to the medium priority range and the current transport capacity is lower than a first threshold value, or if the priority level is set to the low priority range and the current transport capacity is lower than a second threshold value.

Another aspect involves an elevator installation having a drive, an elevator car configured to transport persons and/or robots from a boarding floor to a destination floor in a building, and an elevator control system coupled to the drive and configured to receive an elevator call from a person via a call terminal and from a robot via a radio transceiver. The control system is configured to determine a current transport capacity of the elevator installation, wherein the transport capacity is indicative of current usage of the elevator installation, and to recognize an elevator call originating from the robot via the radio transceiver. The elevator call from the robot includes a priority level set by a dispatcher of the robot, wherein the priority level is one of a high priority range, a medium priority range and a low priority range, and wherein the elevator call is indicative of a boarding floor. The elevator control system is configured to delay allocation of the elevator call originating from the robot to the elevator car if the priority level is set to the medium priority range and the current transport capacity is lower than a first threshold value, or if the priority level is set to the low priority range and the current transport capacity is lower than a second threshold value.

The technology described herein provides that an elevator installation can be used by both humans (persons) and robots, but without the robots negatively affecting efficient and convenient transportation of the persons. According to the technology described herein, use of the elevator installation by one or more robots is scheduled based on current elevator traffic, the elevator installation's available transport capacity and the robot's priority level. In consideration of current traffic caused by the persons, the transportation of a robot may be delayed and kept in a queue, if necessary, so that human elevator traffic is not or only minimally affected.

In one embodiment, the elevator call originating from the robot includes terms of service information specifying a predetermined wait time, wherein the elevator call originating from the robot is allocated to the elevator car upon expiry of the predetermined wait time regardless of the first threshold value or the second threshold value. This allows the operator of the robot to customize call requirements for the robot and its goods and/or services. For example, if the robot's task (e.g., delivery of goods or performing a task such as cleaning) is not urgent and can wait for some time, the operator can specify a maximum wait time. In one embodiment, this may be applied by a building management that coordinates movement of several robots in the building and that strives to optimize all robot traffic within the building and not just that of a single robot for which it may be tempting to set a high priority level.

Further, in one embodiment, the elevator call originating from the robot is kept in a queue until expiry of the predetermined wait time. For example, if the robot's task can wait for some time, the operator may set the priority level of the robot's elevator call to low and specify with the terms of service that if the elevator call is not executed in, e.g., five hours, the robot's elevator must be treated as high priority. The robot's elevator call is then allocated and executed regardless of the transport capacity.

In one embodiment, the elevator call is immediately allocated to the elevator car by the elevator control system if the elevator call originates from a person or the robot having a priority level set to the high priority range. As mentioned above, this contributes to the technology's objective to avoid that the robots negatively affect efficient and convenient transportation of the persons.

In one embodiment, the technology described herein provides for a robot-specific execution of the allocated (robot) call from the robot. This includes at least one of notifying the robot about the elevator car, controlling elevator doors depending on whether the elevator call originating from the robot includes a solo-travel requirement, commanding the robot to board the elevator car and verifying boarding of the robot. For example, if the robot call includes a solo-travel requirement, the elevator doors are held closed until the robot is at the assigned elevator and acknowledges its presence. If solo travel is not required, the elevator doors are held open. In either case, once the elevator doors are open, the elevator control system commands the robot to board the elevator car. In one embodiment, the robot may acknowledge its boarding the elevator car. This allows verifying if the robot successfully boarded the elevator car; the elevator installation may then complete the trip according to the elevator call.

The technology described herein provides for flexibility regarding the threshold values. In one embodiment, the first threshold value and the second threshold value are values between 0% and 100% of a maximum transport capacity, and the first threshold value is lower than the second threshold value. In one embodiment, the first threshold value is set to about 25% of the maximum transport capacity, and wherein the second threshold value is set to about 50% of the maximum transport capacity.

BRIEF DESCRIPTION OF THE DRAWINGS

The novel features and characteristics of the technology are set out in the claims below. The various embodiments of the technology, however, as well as other features and advantages thereof, are best understood by reference to the detailed description, which follows, when read in conjunction with the accompanying drawings, wherein:

DETAILED DESCRIPTION

Figure 1:
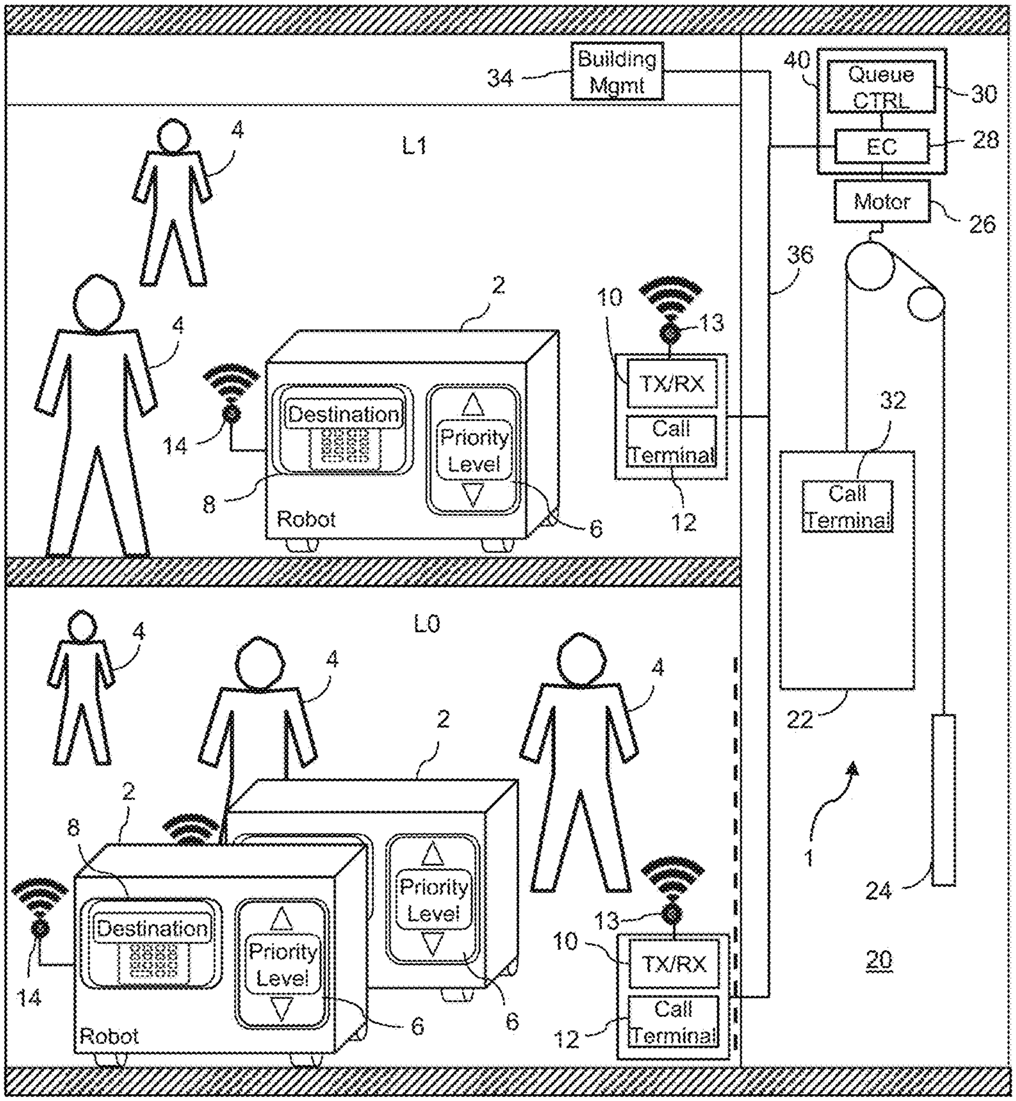
FIG. 1 shows a schematic illustration of an exemplary situation in a building having an elevator installation for use by persons and robots.

FIG. 1 is a schematic illustration of an exemplary situation in a building having an elevator installation 1 for use by persons 4 and autonomous mobile units 2 (hereinafter referred to as robots 2). The building may be an apartment building, an office building, a commercial/shopping center, a hotel, a sports arena, an airport terminal, or any other structure suitable for a person to reside or stay for a longer period of time. The exemplary building shown in FIG. 1 is used herein to describe various embodiments of the technology; it has several floors L0, L1, each one providing access to an elevator car 22 that is movable within an elevator shaft 20 by means of a motor 26 under control of an elevator control system 40. The floor L0 may be a lobby or a basement of the building. Although the building shown in FIG. 1 is shown as having two floors L0, L1, it is contemplated that the building may generally have a plurality of floors.

FIG. 1 shows two robots 2 and three persons 4 on floor L0, and one robot 2 and two persons 4 on floor L1. The persons 4 and the robots 2 may use the elevator installation 1 to move from one floor L0, L1, to another floor L0, L1. According to the technology described herein, scheduling the transport of the persons 4 and the robots 2 depends on the origin of an elevator call (e.g., whether from a person 4 or a robot 2), a determined current transport capacity Tcap of the elevator installation 1, a priority level PL set for an elevator call from a robot 2 and any additional information; these factors are described in more detail below. Briefly, in the exemplary situation illustrated in FIG. 1, the elevator control system 40 determines a current transport capacity Tcap of the elevator installation 1. In case a robot 2 requires an elevator service, the robot 2 initiates an elevator call to be transmitted to the elevator installation 1, wherein such a robot call includes a priority level PL set by a dispatcher of the robot 2. The priority level PL may be within a high priority range, a medium priority range or a low priority range. The elevator control system 40 delays allocation of the robot call to the elevator car 22 under certain circumstances: if the priority level PL is set to the medium priority range and the current transport capacity Tcap is higher than a first threshold value (e.g., 25%), or if the priority level PL is set to the low priority range and the current transport capacity Tcap is higher than a second threshold value (e.g., 50%). This allows intelligent scheduling of one or more robots' use of the elevator installation 1. In consideration of current traffic caused by the persons 4, the transportation of a robot 2 is delayed so that human elevator traffic is not or only minimally affected. One embodiment of such a method of operating the elevator installation 1 is described below with reference to FIG. 3.

Referring to more structural aspects of the elevator installation 1, it is contemplated that certain embodiments of the elevator installation 1 may include several elevator cars 22, which may be organized, for example, in one or more elevator groups. The elevator installation 1 may be configured as a traction elevator (as shown), a hydraulic elevator, or any other type of elevator installation (e. g., self-driven elevator cars, with or without ropes). Furthermore, it is contemplated that the elevator installation 1 may be equipped to operate according to a certain call control technology, i. e., a conventional up/down control system or a destination call control system, as mentioned above. Accordingly, a call terminal 12 on a floor L0, L1 may be equipped with, e. g., up/down push buttons to allow entry of the travel directions; in that case, the elevator car 22 is provided with a call terminal 32 to allow entry of the destination floor after a person 4 boarding the elevator car 22. In connection with a destination call control system, the call terminal 12 on a floor L0, L1 is equipped with, e. g., several push buttons or a graphical user interface (GUI) of a touch screen to allow entry of the destination floor; the call terminal 32 in the elevator car 22 is, then, configured, e. g., to allow the person 4 after boarding to advance or delay closing of an elevator door, but not to enter a destination floor.

Each robot 2 may be based on a commercially available robot technology, e. g., from the company ST Engineering Aethon, Inc., USA. Such a robot 2 typically has a power supply (e. g., a rechargeable battery), a certain drive technology (e. g., a set of driven wheels), sensors (IR, radar, optical), navigation equipment, and, depending on its intended use, one or more actuators for arms or tools and/or one or more receptacles to receive and transport goods according to a specified payload. The general operation of the robot 2, e.g., regarding navigation, is known to one skilled in robotics.

According to the technology described herein, the robot 2 has an interface 8 that allows an operator of the robot 2 to enter a destination (e. g., a floor L0, L1 or a certain area on a floor (e.g., a room)) the robot 2 is supposed to move to; that interface 8 is hereinafter referred to as a destination interface 8. The destination may be entered in one of a variety of ways, for example, by selecting and/or entering an identifier (e.g., name and/or number) assigned to the floor or room, by entering building-specific or GPS coordinates of the destination, by selecting the destination from a displayed building floor plan or a pull-down menu. In the illustrated embodiment, the robot 2 has an interface 6 that allows the operator to set a priority level; that interface 8 is hereinafter referred to as a priority interface 6. The priority level may be entered numerically (e.g., a lowest priority may be PL=1 and a highest priority may be PL=6, or another range) or by one or more words (e.g., "low", "medium" and "high").

The destination interface 8 and the priority interface 6 may each have a touch screen and associated electronic circuits for operating the touch screen, wherein each touch screen may be configured to display a graphical user interface accessible to the operator. For example, while the operator is at the robot 2, the operator may manually enter the destination and the priority level, e. g., by touching the touch screen. It is contemplated that in another embodiment the destination interface 8 and the priority interface 6 may be equipped with keyboards for entering the destination and the priority level.

In another embodiment, at least one of the destination interface 8 and the priority interface 6 may be configured to allow entry via remote control. According to one embodiment, the operator may carry a wireless remote control device (e. g., a dedicated special-purpose device or a smartphone having a dedicated software application (app)) for communicating with the robot 2. Further, remote entry may also be implemented via a building management system 34 that communicates with the robot 2 via a communications network 36. In that embodiment, for example, the operator may be located at the building management system's central station or control room, within or remote form the building.

As shown in the embodiment of FIG. 1, the communications network 36 interconnects the call terminals 12, the elevator controller 28 and the building management system 34. The communications network 36 may use a communications technology for wire-based and/or wireless communications. In the illustrated embodiment, the floors L0, L1 are provided with radio frequency (RF) transceivers 10 TX/RX) that are coupled to the communications network 36. Each transceiver 10 has an antenna 13 and may be installed in a housing together with a call terminal 12. The transceiver 10 may be viewed as an interface between a person 4 and the elevator installation 1 and allow the person 4 to wirelessly enter an elevator call. For that purpose, the person 4 may carry, for example, a smartphone running a dedicated app for communicating with the elevator installation 1. It is contemplated that the person 4 may use the call terminal 12 to communicate with the elevator installation 1.

In the elevator installation 1, locations of the call terminals 12 and the transceivers 10 are "known", for example, the locations may be documented and stored in connection with a floor plan of the building. The communications network 36 may in one embodiment include a wire-based communications bus. Communications over such a communications bus may follow a LON, BACnet or another serial bus protocol. Any other known technology for communications over a wired network may be used.

Communications between connected entities, such as the call terminals 12, the transceivers 10 and the elevator control system 40, may use bus addresses. In one embodiment, a unique identifier (e. g., a device code, a MAC address, an IP address) is assigned to each one of these entities. Theses embodiments allow the elevator control system 40 to identify the one or more entities involved in a communication and, hence, a location of an involved entity.

The transceiver 10 may be viewed as an interface between the robot 2 and the elevator installation 1 and allow the robot 2 to wirelessly communicate with the elevator installation 1. The robot 2 has an RF transceiver-based communications module, of which in FIG. 1 only an antenna 14 is shown. In one embodiment, a unique identifier (e. g., a device code, a MAC address, or a telephone number) is assigned to the robot 2. The robot's RF communications module transmits the identifier when communicating with the elevator installation 1 and/or the building management system 34 so that these entities can assign received signals or messages (elevator calls) to the robot 2. It is contemplated that in one embodiment such a communication takes place via the transceiver 10, as described above. The elevator control system 40, for example, can identify the concerned transceiver 10 and the robot 2 (e. g. on which floor L0, L1) the robot 2 is located. Similarly, the elevator installation 1 and/or the building management system 34 can use the identifiers of the transceiver 10 and the robot 2 to address signals or messages to the robot 2.

The elevator control system 40 includes an elevator control function 28 and a queue control function 30. The configuration of the elevator control function 28 depends on the call control technology (up/down control or destination call control) applied in the elevator installation 1, and includes, for example, allocating a received elevator call to the elevator car 22 and controlling movement of the allocated elevator car 22 accordingly, as is known to skilled person. It is contemplated that the elevator control system 40 may include a group control function if the elevator installation 1 includes groups (or banks) of elevators, wherein each group includes, for example, 4, 6, or 8 elevators, corresponding to 4, 6, or 8 elevator cars 22, respectively. The queue control function 30 is configured to time execution or an elevator call originating from a robot 2. For example, at times of high traffic caused by the persons 4, the current transport capacity available for serving additional elevator calls may be reduced. In such a situation, elevator calls from persons 4 are given preference over elevator calls from robots 2; the elevator calls from the robots 2 kept in a queue under control of the queue control function.

Figure 2:
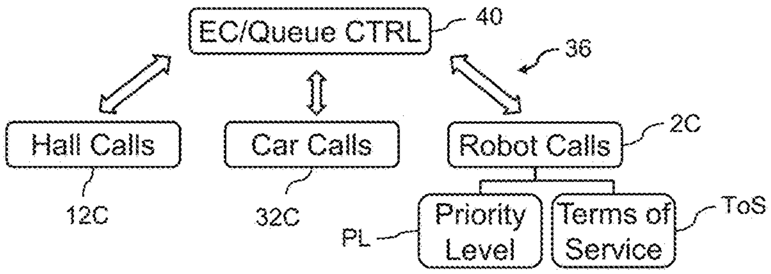
FIG. 2 shows a schematic illustration of exemplary elevator calls which may take place in the situation shown in FIG. 1.

FIG. 2 illustrates exemplary elevator calls which, depending on the call control technology, may take place in the situation shown in FIG. 1. Calls originating from a robot 2 are referred to as robot calls 2C, wherein each robot call 2C includes information concerning a priority, e. g., high, medium, or low, as described below in more detail. This information is hereinafter referred to as "priority level PL"; hence, reference may also be made to a "robot call 2C including a priority level PL". In certain embodiments, a robot call 2C may include additional information, e. g., a set period of time for executing the robot call 2C, as described below in more detail. The additional information is hereinafter referred to as "terms of service ToS"; hence, reference may also be made to a "robot call 2C including one or more terms of service ToS". In the illustrated embodiment, calls originating from a person 4 may be hall calls 12C, for example, via the call terminals 12 (or smartphones communicating with the transceivers 10), and/or car calls 32C via the call terminal 32 in the elevator car 22. If the elevator installation 1 includes a destination call control system, there are typically no car calls 32.

The elevator control system 40 receives one or more of these elevator calls via the communications network 36, and processes them according to the technology described herein. For that purpose, the elevator control system 40 includes an elevator controller 28 that is configured to perform various processing functions, wherein it is contemplated that the processing functions, including algorithms used therefore, depend on the call control technology implemented in the elevator installation 1. The processing includes, for example, determining a volume of traffic based on the number of elevator calls within a certain time period, determining the floors L0, L1 from which the elevator calls originate (these floors L0, L1 may then be viewed as boarding floors), determining the destination floors, allocating one or more elevator cars 22 to service the elevator calls, and executing the elevator calls by operating the motor 26 according to the call allocation. These processing functions and algorithms are known to the skilled person.

For the elevator installation 1, a transport capacity Tcap is defined as a parameter that describes how much utilization of the elevator installation 1 is available. Herein, the transport capacity Tcap is a value between 0% and 100%. For example, during nighttime or stand-by mode, the available transport capacity is about 100%, e.g., an elevator call can be serviced without delay because no or only a few other calls need to be serviced and/or the elevator car 22 is either empty or is not loaded to full weight capacity. With decreasing transport capacity Tcap, the utilization of the elevator installation 1 increases, e.g., the traffic volume increases, and not all elevator calls may be serviced at about the same time; as a consequence, it may take longer until an elevator call can be serviced, which leads to longer waiting times. For example, if the transport capacity Tcap is 0%, a maximum number of persons 4 has boarded the elevator car 22 (e.g., the elevator car 22 is full), the elevator car 22 is loaded to full weight capacity, and/or elevator calls that result in the maximum number of persons 4 and/or the full weight capacity are already allocated to the elevator car 22.

Determining the transport capacity Tcap is an ongoing process within the elevator installation 1, e.g., performed at regular intervals and/or after receiving or servicing an elevator call. The elevator control system 40 may use the traffic volume to determine the transport capacity Tcap. The elevator control system 40 may further use information obtained from a load measurement system installed in the elevator car 22. The load measurement system determines if and how much weight is loaded into the elevator car 22. For example, this allows determining if the elevator car 22 is empty or at its weight limit, or somewhere in between.

With the understanding of the general structure of the elevator installation 1 and certain features of its functions described with reference to FIGS. 1-2, a description of its handling of the various elevator calls follows with reference to FIG. 3. In connection with the illustration of FIG. 3, certain objects and advantages of the herein-described technology are disclosed, for example, providing reliable and efficient operation of the elevator installation 1 to handle elevator calls form person 4 and robots 2, and providing improved quality of service for both persons 4 and robots 2.

Figure 3:
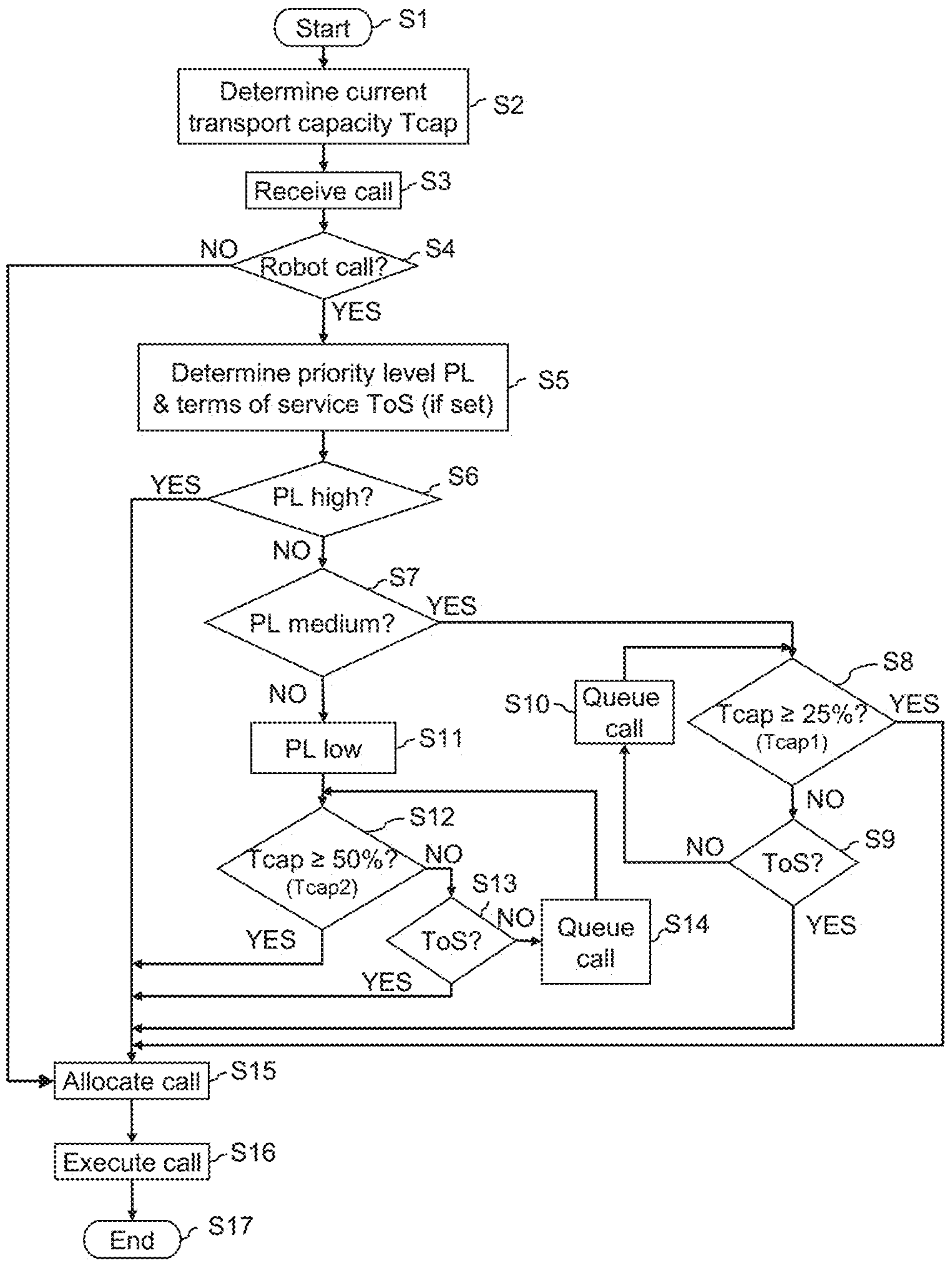
FIG. 3 is a flow diagram of one embodiment of a method of operating the elevator installation.

FIG. 3 shows a multiple-steps flow diagram of one embodiment of a method of operating the elevator installation 1 to achieve at least some of these objectives. It is contemplated that in another illustration of the flow diagram some of the shown steps may be merged into a single step, or split into several separate steps. Further, it is contemplated that the persons 4 and the robots 2 are authorized to move within the building and access the floors L0, L1. If a need for controlling access exists, it is contemplated that the building and/or the elevator installation 1 may be configured to control access to the building, the floors L0, L1 and/or the elevator car 22. Furthermore, it is contemplated that the persons 4 enter elevator calls using the call terminals 12 on the floors L0, L1, and that the robots 2 are within radio range of the transceivers 10 to communicate wirelessly with the elevator installation 1. It is also contemplated that the elevator installation 1 reacts to a robot's and a person's acts and executes corresponding tasks. The operational method is, therefore, performed by the elevator installation 1. The exemplary flow diagram starts at a step S1 and ends at a step S17.

Proceeding to a step S2, a transport capacity Tcap currently prevailing in the elevator installation 1 is determined. In one embodiment, this is performed by the elevator control system 40. As mentioned above, the elevator control system 40 uses, e.g., load measurements and the number of elevator calls received within a predetermined period of time to determine the traffic volume, which is an indication of the available or remaining transport capacity Tcap of the elevator installation 1.

Proceeding to a step S3, an elevator call is received. In the illustrated embodiment, the elevator control system 40 receives the elevator call via the communications network 36. The elevator control system 40 identifies the origin of the elevator call, as described above. For example, the elevator control system 40 processes the IP address associated with the received elevator call to determine the location of the involved call terminal 12 or the involved transceiver 10; i. e., on what floor L0, L1 the elevator call was entered. If in addition an identifier of a robot 2 is associated with the elevator call, the elevator control system 40 also processes the identifier to identify the robot 2 and its location.

Proceeding to a step S4, it is determined if the elevator call is a robot call 2C. The elevator control system 40 performs this determination based on the processing performed in the step S3. If the elevator call is not a robot call 2C, i. e., a person 4 entered the elevator call, the method proceeds along the NO branch to a step S15.

In the step S15, the elevator control system 40 allocates the elevator call to an elevator car 22 and executes the elevator call in a step S16. For example, once the elevator control system 40 allocates the elevator car 22 to service the elevator call, the elevator controller 28 controls the motor 26 to move the elevator car 22 to the boarding floor (unless the elevator car 22 is already at this floor, e.g., in a stand-by mode). Upon arrival at the boarding floor, the elevator doors (shaft doors and car doors) are controlled to open to allow boarding. At expiry of a set door dwell time, the elevator doors are controlled to close, and, with the destination floor having been entered, the elevator controller 28 controls the motor 26 to move the elevator car 22 to the destination floor. Embodiments for call allocation and execution of the elevator call are known to the skilled person.

Returning to the step S4, if the elevator call is a robot call 2C, the method proceeds along the YES branch to a step S5. As mentioned above, the robot call 2C includes a priority level PL; in certain embodiments it may further include information concerning terms of service ToS. Such terms of service allow for customization of the robot's call requirements. For example, the terms of service ToS may specify a predetermined wait time, e.g., that the robot call 2C has to be serviced by a certain time or within a set period of time, e.g., within the next one, two or five hours. In the step S5, the priority level PL of the received elevator call and any set terms of service ToS are determined.

Proceeding to a step S6, if the priority level PL is set to high, the method proceeds along the YES branch to the step S15 and the robot call 2C is allocated and executed in the step S16. For example, the robot call 2C may have a high priority level PL if the robot 2 is dispatched to urgently transport goods, such as patient files or medication in a hospital or a hotel. In such a situation, the elevator control system 40 treats the high-priority robot call 2C essentially the same way as an elevator call from a person 4 (compare NO branch of step S4). If the priority level PL is not set to high, the method proceeds along the NO branch to a step S7.

In the step S7, if the priority level PL is set to medium, the method proceeds along the YES branch to a step S8, otherwise along the NO branch to a step S11. For example, the robot call 2C may have a medium priority level PL if the robot 2 is dispatched to transport goods, such as a meal, reading material or flowers to a patient in a hospital or hotel.

In the step S8, it is determined if the transport capacity Tcap is about 25% or higher than 25%. That is, at least a quarter of the transport capacity Tcap is available for servicing the robot call 2C. If this is the case, the method proceeds along the YES branch to the step S15 and the robot call 2C is allocated and executed in the step S16. However, if the transport capacity Tcap is lower than about 25%, the robot call 2C is not allocated in view of the transport capacity Tcap only, and the method proceeds along the NO branch to a step S9.

In the step S9, it is determined if any set terms of service ToS for the robot call 2C, as described above in connection with the step S5, are met. If the terms of service ToS are not met, or the robot call 2C does not include any terms of service ToS, the method returns along the NO branch and via a queuing step (step S10) to the step S8. That is, allocation (step S15) and execution (step S16) of the robot call 2C are delayed and kept in a queue (step S10) until the requirement regarding the transport capacity Tcap of step S8 is met. If, however, the terms of service ToS are met, the method proceeds along the YES branch to the step S15. That is, in one embodiment, the terms of service ToS may cause the robot call 2C to be allocated (step S15) and executed (step S16) even if the transport capacity Tcap is lower than about 25%.

Referring to the step S7 and its NO branch to the step S11, the priority level PL is neither high nor medium. Accordingly, in the step S11, the determined priority level PL is low. The robot call 2C may have a low priority level PL if the robot 2 is dispatched to perform, for example, cleaning or trash collection tasks.

Proceeding to a step S12, it is determined if the transport capacity Tcap is about 50% or higher than 50%. That is, at least half of the transport capacity Tcap is available for servicing the robot call 2C. If this is the case, the method proceeds along the YES branch to the step S15 and the robot call 2C is allocated and executed in the step S16. However, if the transport capacity Tcap is lower than about 50%, the robot call 2C is not allocated in view of the transport capacity Tcap only, and the method proceeds along the NO branch to a step S13.

In the step S13, it is determined if any set terms of service ToS for the robot call 2C, as described above in connection with the step S5, are met. If the terms of service ToS are not met, or the robot call 2C does not include any terms of service ToS, the method returns along the NO branch and via a queuing step (step S14) to the step S12. That is, allocation (step S15) and execution (step S16) of the robot call 2C are delayed and kept in a queue (step S14) until the requirement regarding the transport capacity Tcap of step S13 is met. If, however, the terms of service ToS are met, the method proceeds along the YES branch to the step S15. That is, in one embodiment, the terms of service ToS may cause the robot call 2C to be allocated (step S15) and executed (step S16) even if the transport capacity Tcap is lower than about 50%.

In the embodiment described with reference to FIG. 3, the robot call 2C may have the priority levels high, medium, and low. It is contemplated, however, that in other embodiments other and/or different priority levels may be defined. For example, the priority levels may take into account certain transport requirements for the robot 2, such as a requirement for an empty elevator car 22 so that the robot 2 may travel solo ("solo travel") or a transport without intermediate stop. According to one embodiment, the priority levels may be defined as 1-6, wherein the priority levels 1 and 2 are defined as low priorities with the priority level 2 having the requirement of "solo travel", wherein the priority levels 3 and 4 are defined as medium priorities with the priority level 4 having the requirement of "solo travel", and wherein the priority levels 5 and 6 are defined as low priorities with the priority level 6 having the requirement of "solo travel".

As mentioned above, the priority levels may be entered by an operator at the priority interface 6.

Figure 4:
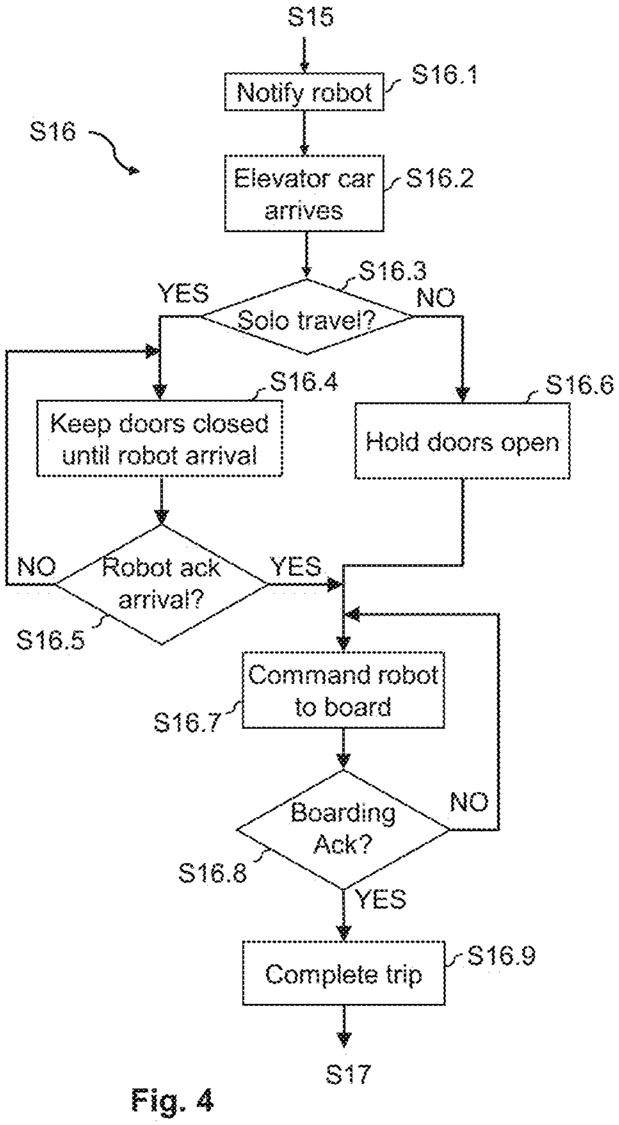
FIG. 4 is a flow diagram of one embodiment of a robot call execution step of the method shown in FIG. 3.

FIG. 4 is a flow diagram of one embodiment of the robot call execution step S16 of the method shown in FIG. 3. Once the call is allocated in step S15 of FIG. 3, the robot 2 is notified of this allocation in a step S16.1. The notification occurs via the communication interface. If there are several elevators, e.g., several elevator cars 22, the notification identifies the elevator and the robot 2 can move towards the identified elevator. In one embodiment, the notification may specify that the elevator car 22 is on its way and specify an arrival time.

Proceeding to a step S16.2, the elevator car 22 arrives at the boarding floor.

Proceeding to a step S16.3, it is determined if the robot call includes the requirement of a solo travel. The solo-travel requirement may be specified by means of the priority level included in the robot call, as mentioned above. The solo-travel requirement essentially reserves the assigned elevator for the robot's trip. If a solo travel is required, the method proceeds along the YES branch to a step S16.4, otherwise the method proceed along the NO branch to a step S16.6.

In the step S16.4, the elevator doors remain closed until the robot 2 arrives at the assigned elevator or elevator car 22. This prevents that the (reserved) elevator car 22 can be boarded prior to the robot's arrival, e.g., by a person 4 or another robot. In one embodiment, the elevator control system 40 may activate an audible and/or visible announcement for persons 4 in the vicinity of the elevator doors that allow boarding the assigned elevator car 22. For example, the announcement may inform them that the elevator car 22 is reserved for the robot 2 and may ask them to make room to allow the robot 2 to board the elevator car 22. This contributes to an efficient execution of the robot's solo travel.

In the step S16.4, the elevator doors open. At this time, any person 4 whose elevator call has been allocated to this elevator car 22 may board.

Proceeding from the step S16.4 to a step 16.5, it is determined if the robot acknowledges (ack) its arrival or presence at the assigned elevator. The robot 2 may communicate its presence or arrival at the elevator to the elevator control system 40 which then causes opening the elevator doors. If the robot 2 acknowledges its arrival or presence, the method proceeds along the YES branch to a step S16.7, otherwise the method proceeds along the NO branch and returns to the step S16.4 and waits with the elevator doors being closed until the arrival or presence is acknowledged.

In the step 16.7, which follows the step S16.5 or the step S16.6, the method commands the robot 2 to board the elevator car 22. In response to that command, the robot 2 boards the elevator car 22.

Proceeding to a step S16.8, it is determined if the robot acknowledges (ack) its boarding the elevator car 22. The robot 2 may communicate its boarding to the elevator control system. If the robot 2 acknowledges its boarding, the method proceeds along the YES branch to a step S16.9 and the elevator control system 40 causes completion of the elevator trip according to the robot call. The method then proceeds to the step S17 shown in FIG. 3.

If the robot 2 does not acknowledge its boarding, the method proceeds along the NO branch. In the illustrated embodiment, the method returns to the step S16.7 and commands the robot 2 again to board the elevator car 22. In another embodiment, the method may not repeatedly command the robot 2 and wait until the robot's boarding acknowledgment is available; the method my return to the input of the step S16.8. It is contemplated that the loop along the NO branch of the step S16.8 is in one embodiment interrupted after a predetermined period of time and/or a predetermined number of repeated commands in the step S16.7. This ensures, for example, that the elevator car 22 is not blocked from servicing another elevator call for more time than is defined to be acceptable for the elevator installation 1.

The invention claimed is:

1. A method of operating an elevator installation having an elevator control system and an elevator car controlled by the elevator control system to transport persons and/or robots from a boarding floor to a destination floor in a building, wherein the elevator control system is configured to receive an elevator call from a person via a call terminal and from a robot via a radio transceiver to communicate with the elevator control system, the method comprising:

determining, by the elevator control system, a current transport capacity of the elevator installation, the transport capacity being indicative of current usage of the elevator installation;

recognizing, by the elevator control system, an elevator call originating from the robot via the radio transceiver, wherein the elevator call from the robot includes a priority level set by a dispatcher of the robot, wherein the priority level is one of a high priority range, a medium priority range and a low priority range, the elevator call being indicative of a boarding floor; and delaying allocation of the elevator call originating from the robot to the elevator car if the priority level is set to the medium priority range and the current transport capacity is lower than a first threshold value; or if the priority level is set to the low priority range and the current transport capacity is lower than a second threshold value.

2. The method of claim 1, wherein the elevator call originating from the robot includes terms of service information specifying a predetermined wait time, and wherein the elevator call originating from the robot is allocated to the elevator car upon expiry of the predetermined wait time regardless of the first threshold value or the second threshold value.

3. The method of claim 2, further comprising queuing the elevator call originating from the robot until expiry of the predetermined wait time.

4. The method of claim 1, further comprising immediately allocating the elevator call to the elevator car by the elevator control system if the elevator call originates from the person or the robot having a priority level set to the high priority range.

5. The method of claim 1, further comprising executing, by the elevator control system, an allocated call, wherein executing the allocated call includes controlling the elevator car according to the allocated call.

6. The method of claim 5, wherein executing the allocated call includes at least one of notifying the robot about the elevator car, controlling elevator doors depending on whether the elevator call originating from the robot includes a solo-travel requirement, commanding the robot to board the elevator car and verifying boarding of the robot.

7. The method of claim 1, wherein the first threshold value and the second threshold value are values between 0% and 100% of a maximum transport capacity, and wherein the first threshold value is lower than the second threshold value.

8. The method of claim 7, wherein the first threshold value is set to about 25% of the maximum transport capacity, and wherein the second threshold value is set to about 50% of the maximum transport capacity.

9. An elevator installation, comprising:

a drive;

an elevator car configured to transport persons and/or robots from a boarding floor to a destination floor in a building an elevator control system coupled to the drive and configured to receive an elevator call from a person via a call terminal and from a robot via a radio transceiver, wherein the control system is configured to:

determine a current transport capacity of the elevator installation, the transport capacity being indicative of current usage of the elevator installation;

recognize an elevator call originating from the robot via the radio transceiver, wherein the elevator call from the robot includes a priority level set by a dispatcher of the robot, wherein the priority level is one of a high priority range, a medium priority range and a low priority range, the elevator call being indicative of a boarding floor; and delay allocation of the elevator call originating from the robot to the elevator car if the priority level is set to the medium priority range and the current transport capacity is lower than a first threshold value; or if the priority level is set to the low priority range and the current transport capacity is lower than a second threshold value.

10. The elevator installation of claim 9, wherein the elevator call received from the robot includes terms of service information specifying a predetermined wait time, and wherein the elevator call received from the robot is allocated to the elevator car upon expiry of the predetermined wait time regardless of the first threshold value or the second threshold value.

11. The elevator installation of claim 10, wherein the elevator control system comprises an elevator control function and a queue control function, wherein the queue control function is configured to queue the elevator call received from the robot until expiry of the predetermined wait time.

12. The elevator installation of claim 9, wherein the elevator control system is configured to immediately allocate the elevator call to the elevator car if the elevator call originates from the person or the robot having a priority level set to the high priority range.

13. The elevator installation of claim 9, wherein the elevator control system is configured to execute an allocated call, wherein executing the allocated call includes controlling the elevator car according to the allocated call.

14. The elevator installation of claim 9, wherein the first threshold value and the second threshold value are values between 0% and 100% of a maximum transport capacity, and wherein the first threshold value is lower than the second threshold value.

15. The elevator installation of claim 14, wherein the first threshold value is set to about 25% of the maximum transport capacity, and wherein the second threshold value is set to about 50% of the maximum transport capacity.

* * * * *